United States Patent
Marsnik et al.

(10) Patent No.: US 8,145,596 B2
(45) Date of Patent: Mar. 27, 2012

(54) VALUE ASSESSMENT OF A COMPUTER PROGRAM TO A COMPANY

(75) Inventors: Jamie B. Marsnik, Minneapolis, MN (US); Omkar A. Nalamwar, Irvine, CA (US); Thomas M. Smalley, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 1611 days.

(21) Appl. No.: 11/227,762

(22) Filed: Sep. 15, 2005

(65) Prior Publication Data

US 2007/0067260 A1   Mar. 22, 2007

(51) Int. Cl.
  *G06F 7/00*    (2006.01)
  *G06F 17/00*   (2006.01)
  *G06F 12/00*   (2006.01)
  *G06F 17/30*   (2006.01)

(52) U.S. Cl. ............ 707/609; 707/822; 705/59; 705/52

(58) Field of Classification Search .................. None
See application file for complete search history.

(56) References Cited

U.S. PATENT DOCUMENTS

| | | | |
|---|---|---|---|
| 5,717,604 A | 2/1998 | Wiggins | 364/514 |
| 6,356,880 B1 | 3/2002 | Goossens et al. | 705/30 |
| 6,381,587 B1 | 4/2002 | Guzelsu | 705/40 |
| 6,523,173 B1 | 2/2003 | Bergner et al. | 717/152 |
| 2002/0069143 A1 | 6/2002 | Cepeda | 705/30 |
| 2002/0083003 A1* | 6/2002 | Halliday et al. | 705/52 |
| 2002/0107809 A1* | 8/2002 | Biddle et al. | 705/59 |
| 2002/0138441 A1* | 9/2002 | Lopatic | 705/59 |
| 2002/0161717 A1 | 10/2002 | Kassan et al. | 705/59 |
| 2003/0083888 A1 | 5/2003 | Argenton et al. | 705/1 |
| 2004/0088176 A1 | 5/2004 | Rajamani | 705/1 |
| 2004/0088730 A1 | 5/2004 | Gopalan et al. | 725/93 |
| 2004/0093594 A1 | 5/2004 | Kapadia et al. | 717/170 |
| 2004/0260589 A1 | 12/2004 | Varadarajan et al. | 705/8 |
| 2005/0049887 A1 | 3/2005 | Bulleit et al. | 705/1 |
| 2005/0049973 A1* | 3/2005 | Read et al. | 705/59 |
| 2005/0060662 A1 | 3/2005 | Soares et al. | 715/810 |
| 2005/0065863 A1 | 3/2005 | Plumer et al. | 705/30 |
| 2005/0149447 A1* | 7/2005 | Sherkow | 705/52 |

FOREIGN PATENT DOCUMENTS

WO   WO 2004/070574 A2   8/2004

* cited by examiner

*Primary Examiner* — Pierre Vital
*Assistant Examiner* — Loan T Nguyen
(74) *Attorney, Agent, or Firm* — Yee & Associates, P.C.; Arthur J. Samodovitz

(57) ABSTRACT

System, computer implemented method and program for assessing value of a computer program installed in a computer of a company. Determinations are made as to (a) an order that the computer program is started in a startup sequence of the computer, (b) whether the computer is used for production purposes, (c) how frequently or at what interval the computer program or data generated by the computer program is backed up, (d) an order or time in which the computer program is scheduled for recovery in event of disaster, (e) a type of a library which contains the computer program, (f) an amount of usage of the computer program by the company, and (f) how recently the computer program or data generated by the computer program has been accessed. Respective weighting factors are applied to results of the three or more determinations and the weight factored results are combined.

14 Claims, 3 Drawing Sheets

| FACTOR | | NORMALIZED FACTOR | WEIGHT |
|---|---|---|---|
| DR SCHEDULE | PRT = AMT OF TIME TO PROGRAM RECOVERED<br>TRT = TOTAL RECOVERY TIME IN DR PLAN | PRT/TRT | .3 |
| STARTED TASK SCHEDULE | SST = SEQUENCE IN STARTED TASK LIST<br>TST = TOTAL # IN STARTED TASK LIST | SST/TST | .1 |
| BACKUP SCHEDULE | TBB = TIME BETWEEN BACKUPS<br>MTBB = MAX TIME BETWEEN BACKUPS | TBB/MTBB | .1 |
| INSTALL INVENTORY | NBI = # OF BOXES THIS PROGRAM IS INSTALLED<br>MBNI = MAX # BOXES ANY PROGRAM IS INSTALLED | NBI/MNBI | .05 |
| DATA ASSOCIATED LAST ACCESS CURRENCY | DA = MINIMUM # OF DAYS SINCE DATA GENERATED FROM THIS PROGRAM WAS LAST ACCESSED/READ<br>TDA = MINIMUM # OF DAYS SINCE DATA GENERATED FROM ANY PROGRAM WAS LAST ACCESSED/READ | DA/TDA | .1 |
| # OF USERS | NU = # OF USERS FOR THIS PROGRAM THIS YEAR<br>MNU = MAX # OF USERS FOR A SINGLE PROGRAM THIS YEAR | NU/MNU | .1 |
| AMOUNT OF USAGE | NUS = # OF USES FOR THIS PROGRAM THIS YEAR<br>MNUS = MAX # OF USES FOR A SINGLE PROGRAM THIS YEAR | NUS/MNUS | .2 |
| INVESTMENT PREFERENCE | NDI = # OF DAYS SINCE PUT ON INVEST STATUS<br>MNDI = MAX # OF DAYS OF ANY PRODUCT PUT ON INVEST STATUS | NDI/MNDI | .05 |

| FACTOR | | NORMALIZED FACTOR | WEIGHT |
|---|---|---|---|
| DR SCHEDULE | PRT = AMT OF TIME TO PROGRAM RECOVERED<br>TRT = TOTAL RECOVERY TIME IN DR PLAN | PRT/TRT | .3 |
| STARTED TASK SCHEDULE | SST = SEQUENCE IN STARTED TASK LIST<br>TST = TOTAL # IN STARTED TASK LIST | SST/TST | .1 |
| BACKUP SCHEDULE | TBB = TIME BETWEEN BACKUPS<br>MTBB = MAX TIME BETWEEN BACKUPS | TBB/MTBB | .1 |
| INSTALL INVENTORY | NBI = # OF BOXES THIS PROGRAM IS INSTALLED<br>MBNI = MAX # BOXES ANY PROGRAM IS INSTALLED | NBI/MNBI | .05 |
| DATA ASSOCIATED LAST ACCESS CURRENCY | DA = MINIMUM # OF DAYS SINCE DATA GENERATED FROM THIS PROGRAM WAS LAST ACCESSED/READ<br>TDA = MINIMUM # OF DAYS SINCE DATA GENERATED FROM ANY PROGRAM WAS LAST ACCESSED/READ | DA/TDA | .1 |
| # OF USERS | NU = # OF USERS FOR THIS PROGRAM THIS YEAR<br>MNU = MAX # OF USERS FOR A SINGLE PROGRAM THIS YEAR | NU/MNU | .1 |
| AMOUNT OF USAGE | NUS = # OF USES FOR THIS PROGRAM THIS YEAR<br>MNUS = MAX # OF USES FOR A SINGLE PROGRAM THIS YEAR | NUS/MNUS | .2 |
| INVESTMENT PREFERENCE | NDI = # OF DAYS SINCE PUT ON INVEST STATUS<br>MNDI = MAX # OF DAYS OF ANY PRODUCT PUT ON INVEST STATUS | NDI/MNDI | .05 |

FIG. 3

VALUE ASSESSMENT OF A COMPUTER PROGRAM TO A COMPANY

FIELD OF THE INVENTION

The invention relates generally to computer systems, and more particularly to a program tool to assess value to a company of an application program or other computer program installed in one or more computers of the company.

BACKGROUND OF THE INVENTION

Computer programs such as applications, middleware and operating systems are well known today. There are a wide variety of known applications such as database applications, web applications, business function applications, etc. Middleware provides compatibility and inter operability of different applications, central application management and system infrastructure management. There are a wide variety of operating systems known today, such as PC operating systems and server operating systems.

Typically, the copyright owner or licensor of each computer program charges a license fee for installation (and use) of the computer program by the customers/licensees. The license fee may be ongoing, and the license may extend for a limited period of time, such as one year. A company/licensee may want to assess the value of the computer program to the company when deciding whether to continue the license (and pay the ongoing fees) if terminable and/or renew the existing license if soon to expire.

It was known to examine the computer program's usage history as a way to assess the value of the computer program to a company.

An object of the present invention is to improve the assessment of the value of a computer program to a company.

SUMMARY

The present invention resides in a system, computer implemented method and program for assessing value of a computer program installed in a computer of a company. Determinations are made as to (a) an order that the computer program is started in a startup sequence of the computer, (b) whether the computer is used for production purposes, (c) how frequently or at what interval the computer program or data generated by the computer program is backed up, (d) an order or time in which the computer program is scheduled for recovery in event of disaster, (e) a type of a library which contains the computer program, (f) an amount of usage of the computer program by the company, and (f) how recently the computer program or data generated by the computer program has been accessed. Respective weighting factors are applied to results of the three or more determinations and the weight factored results are combined.

BRIEF DESCRIPTION OF THE FIGURES

FIG. 3 is a table defining an example of rules (i.e. factors and weights) within the program tool of FIG. 1 to assess the value of the computer program to the company.

DETAILED DESCRIPTION OF THE PREFERRED EMBODIMENTS

Figure 1:
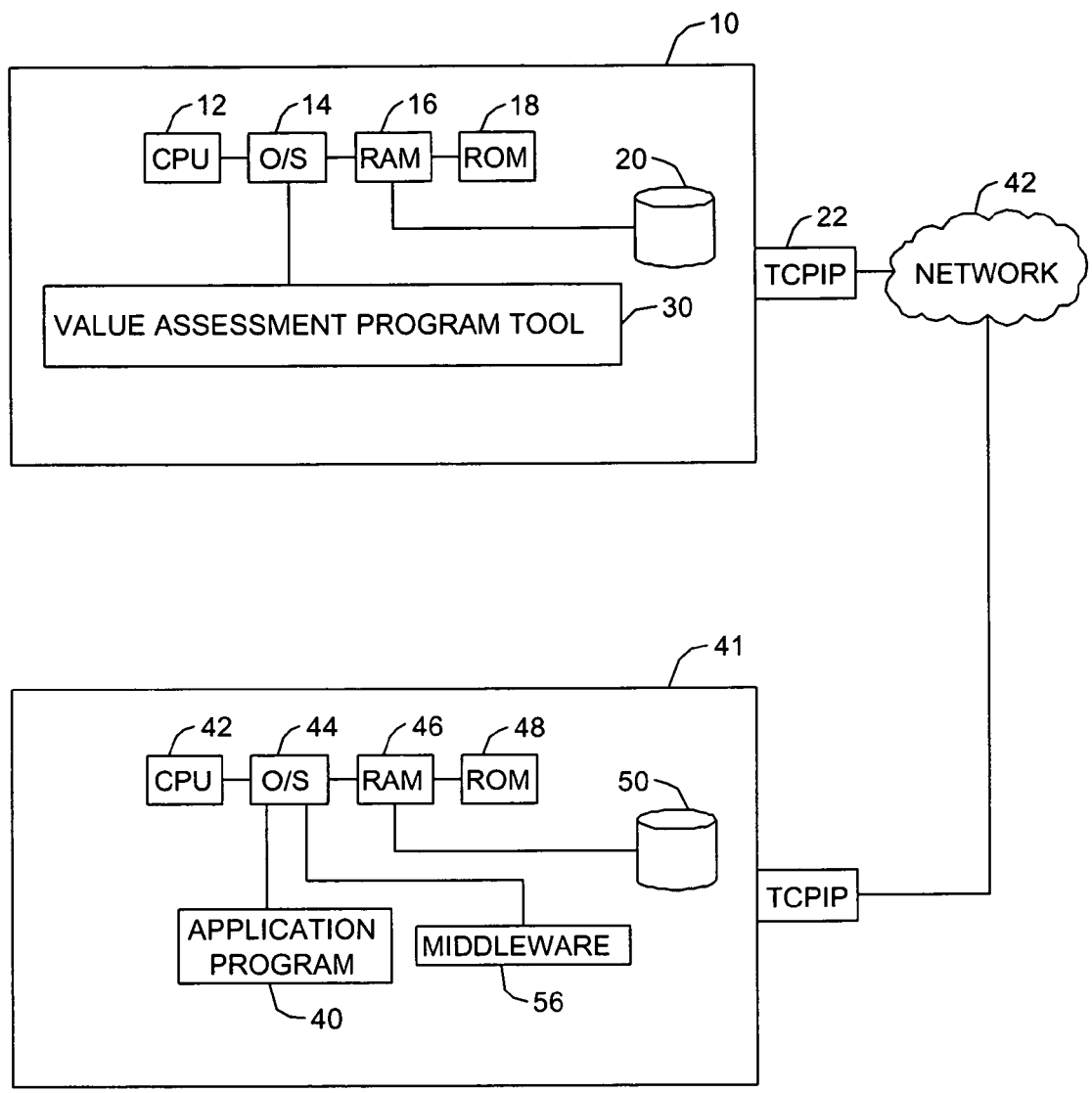
FIG. 1 is a block diagram of a computer system including a program tool according to the present invention to assess the value of a computer program to a company.

The present invention will now be described in detail with reference to the figures. FIG. 1 illustrates a computer system 10 with known CPU 12, operating system 14, RAM 16, ROM 18, storage 20 and TCP/IP adapter card (or other network interface) 22. Computer system 10 also includes a program tool 30 according to the present invention to assess value of a computer program to a company.

FIG. 1 also illustrates a known computer system 41 which is coupled to computer system 10 via a network 42. Known computer system 41 includes known CPU 42, operating system 44, RAM 46, ROM 48, storage 50, TCP/IP adapter card 52, application program 40 and middleware 56. By way of example, application program 40 can be a database application, web application, business function application, etc., and middleware 56 can be IBM Websphere program, IBM SQL Middleware program or Sun Java Middleware program. Program tool 30 assesses the value of each of operating system 44, application program 40 and middleware 56, to the company which has licensed and has installed these computer programs in one or more computers of the company. Program tool 30 considers for each of the computer programs, such as application program 40, the following factors in assessing the value the computer program to the company:

A sequence or order number that the computer program is started in a startup sequence for computer 41. Generally, the earlier the program is started in the order, the more likely that later started programs rely on the program and therefore, the more important and valuable the computer program 40 to the company.

A type (for example, production, development or test) of computer 41 in which the computer program 40 is installed. Generally, a computer program installed on a production computer is more important and valuable to a company than a computer program installed on a development computer. Generally, a computer program installed on a development computer is more important and valuable to a company than a computer program installed on a test and debug computer.

How frequently the computer program 40 or data generated by computer program 40 is scheduled for backup. Generally, the more frequently the computer program 40 or the data generated by the computer program 40 is scheduled for backup, the more important and valuable is the computer program 40 to the company.

An order in which the computer program 40 and its data are scheduled for recovery in case of disaster. Generally, the sooner a computer program and its data are scheduled for recovery, the more important and valuable is the computer program to the company.

A type of library which contains the computer program 40. Some libraries are known to contain more important and valuable computer programs than others, and identities of such libraries and their relative importance are stored in a file.

An amount of usage of the computer program 40, for example, based on number of users of the computer program 40, number of accesses to the computer program 40, number of CPU hours used by the computer program 40 each month, number of logical partitions ("LPARs") that execute this computer program 40 (in those computing environments where the computer program is executed in one or more LPARs), etc.

How recently the computer program 40 or the data generated by the computer program 40 has been accessed. If the computer program 40 or its data has not been accessed by a user for a considerable time, then the computer program 40 will tend to have a lower value to the company.

Whether the owner of the computer program 40 has previously entered into a database the owner's plans for the computer program 40, such as research, pre invest, invest, maintain, disinvest or exit.

Total number of computers in which the computer program is installed, and/or total number of copies of the computer program 40 which are installed in all computer(s) of the company. Generally, the greater the number, the greater the value and importance of the computer program 40.

How problematic has been the computer program 40. Generally, a significant number of problems (for example, problem tickets) with the computer program 40 will reduce its value to the company.

Whether computer program is listed as "owned" by a business function or whether it is listed as "owned" by an individual within the company. Generally, a computer program "owned" by a business function (such as a department) has more value than a computer program "owned" by an individual because a computer program owned by a business function is typically used by multiple individuals.

Figure 2:
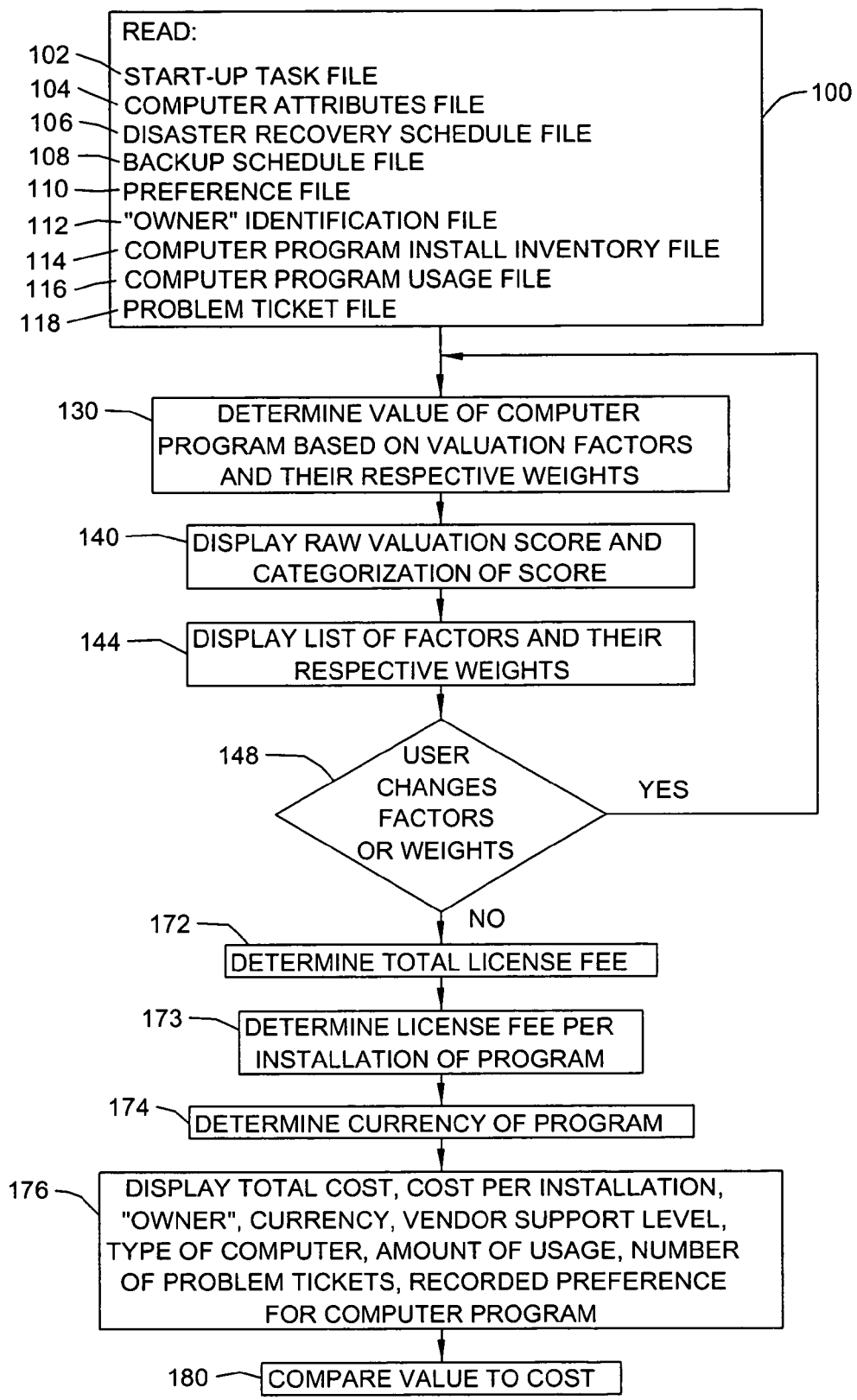
FIG. 2 is a flowchart of the program tool of FIG. 1.

Program tool 30 is illustrated in more detail in FIG. 2. The steps of FIG. 2 are performed for each computer program whose value is to be assessed. In step 100, program 30 reads data from various files as follows:

Name of File: Type of Information that Program 30 Reads from the File

Startup Task Input File 102: Sequence number that the computer program 40 is started in startup sequence, i.e. first, second, third, fourth, etc.

Computer Attributes File 104: Type of computer (ex. production, development or test) in which the computer program 40 is installed.

Disaster Recovery Schedule File 106: Sequence number that the computer program 40 will be recovered in a disaster recovery process, i.e. first program, second program, third program, etc. or the day after the disaster in which the computer program 40 will be recovered, i.e. first day, second day, third day, etc.

Backup Schedule File 108: Frequency of backup of data generated by the computer program 40 (and/or the computer program 40 itself).

Investment Preference File 110: Previously expressed preference of "owner" of computer program 40 to (a) "research investment", (b) "reinvestment", (c) invest, (d) maintain investment, (e) disinvestment, or (f) exit.

"Owner" File 112: Type of "owner" of computer program, ex. business function or individual. The "owner" is the entity within the company that is responsible for and may have paid the license fee for the computer program 40. If the file 112 does not directly identify the "owner", then program 30 determines the "owner" based on naming standards of the libraries from which the program was found. Program 30 also reads from file 112 a name of a library which contains program 40, and if provided, an indication of the value of programs within that library.

Computer Program Install Inventory File 114: Identity of all computers of the company on which the computer program 40 is installed and the total number of copies of the computer program 40 which are installed in all computers of the company.

Computer Program Usage File 116: Amount of usage of the computer program 40 during an applicable period, for example, number of different users, number of accesses, usage time, amount of processor time devoted to computer program 40, etc. and time of last access of computer program 40 or data generated by computer program 40.

Problem Ticket File 118: Number and severity of problem tickets opened for the computer program 40.

FIG. 3 illustrates an example of rules used by program 30 to assess value of program 40. The rules include a listing of the relevant factors, normalized factors and the weights of the normalized factors. After collecting the foregoing information/factors from files 104-118, program 30 applies the rules of FIG. 3 to weight each of the normalized factors and sum the weighted normalized factors, and thereby estimate a value of the computer program 40 to the company (step 130). The following is an example of the value assessment equation:

The "disaster recovery schedule" normalized factor "PRT/TRT" equals the scheduled time to recover program 40 divided by the total scheduled time to recover all the computer programs on the disaster recovery plan.

The "startup task schedule" normalized factor "SST/TSS" equals the startup sequence number of computer program 40 divided by the total number of computer programs to be started in computer 41.

The "backup schedule" normalized factor "TBB/MTBB" equals the scheduled time between backups of computer program 40 divided by the maximum scheduled time between backup of any program on computer 41.

The "install inventory" normalized factor "NBI/MNBI" equals the total number of computers of the company in which computer program 40 is installed divided by the total number of computers on which any computer program of the company is installed.

The "last access" normalized factor "DA/TDA" equals the number of days since the computer program 40 was last accessed during the applicable period or its data divided by the minimum number of days during the applicable period between access of any computer program or its data on computer 41.

The "number of users" normalized factor "NU/MNU" equals the number of users of computer program 40 during the applicable period divided by the maximum number of users of any computer program of the company during the same period.

The "amount of usage" normalized factor "NUS/MNUS" equals the number of uses of computer program 40 during the applicable period divided by the maximum number of uses of any computer program of the company during the same period.

The "investment preference" normalized factor "NDI/MNDI" equals number of days, if any, since registered for "investment" status divided by the maximum number of days, if any, since any program on computer 41 was registered for "investment" status.

Program 30 then multiplies each of the forgoing normalized factors by their respective weight, listed in the adjacent column of FIG. 3, and sums all the weighted normalized factors to yield the assessed value of computer program 40. It should be understood that the foregoing value assessment equation is just one example of factors and weights applied to the factors to assess the value of the computer program 40 (and other computer programs as well). The specific equation described above is not critical to the present invention, i.e. different factors and weights of factors can be used, within the scope of the present invention.

After assessing the value of the computer program 40, program 30 displays a raw valuation score to the user and categorizes the score, for example, very high value, high value, average value, low value, or very low value (step 140). (If desired, program 30 can divide the valuation into a greater or lesser number of categories.) Upon request by the user, program 30 also displays the list of factors and their weighting factors that program 30 applied in equation 120, and the actual equation 120 (step 144), and permits the user to delete any of the factors or change its weighting factor. The user may delete any of the factors or change any of the weighting factors that the user deems uncharacteristic of the real value of the computer program 40 to the company. If the user makes such a change (decision 148, yes branch), then program 30 performs step 140 again with the remaining factors or new weighting factor(s), and displays the new result in step 142.

After program 30 determines the value of the computer program 40 to the company, computer program 40 determines and displays information that will help the user decide whether to continue to pay the license fee (if the license has ongoing fees and is terminable) or renew the license if soon to expire. Accordingly, program 30 reads a Cost Allocation file 170 to determine the monthly license fee for computer program 40 (step 172). An administrator previously entered the license fee into file 170. If the license applied collectively to a group of computer programs (including computer program 40), then in step 174, program 30 determines the portion of the total license fee attributable to computer program 40 by one of the provided methods: computer count, computer size, user count, or amount of usage. The computer count method applies the cost proportionately by taking the collective fees and dividing it by the total number of programs installed per computer. The more computers on which the program is installed the greater the proportion of allocated costs. The computer size method applies the cost by proportionately dividing the collective fees and by the total computer size rating of programs installed per computer. Programs installed on larger, more powerful computers would, therefore, bear a greater portion of the costs in this method. The user-count method applies the cost proportionately by dividing the collective fees by the total number of users per program. The more users associated with a certain program the greater portion of the collective fees that the program would be allocated. Finally, the usage method applies the cost proportionately by dividing the collective fees by the total usage of the program. Therefore, programs with more usage would be allocated a greater percentage of the collective fees. Next, program 30 determines the cost of each installation of computer program 40 by dividing the total cost attributed to computer program 40 by the number of copies/installations of the computer program 40 within the company (step 173). Next, program 30 displays (a) the total cost of computer program 40, (b) cost per installation of computer program 40, (c) "owner" of the computer program 40 (who should be consulted in making the decision whether to continue paying for computer program 40), (d) currency of the computer program 40, i.e. whether the computer program was released in the last year, (d) vendor support level of computer program 40, for example, fully supported, partially supported or unsupported (if the vendor support level is low, then this is a factor in terminating the license), (e) type and number of computer(s) in which computer program is installed, (f) amount of usage of computer program 40 by the company, (g) number of problem tickets for computer program 40 or other measure of program performance, (h) cost of similar programs installed within the company's computers (to allow comparison of relative cost), and (g) the company's previously expressed preference, if any, to continue to research, pre invest, invest, maintain, disinvest, or exit (step 176). Optionally, program 30 can also display a program functionality classification, for example, system software, application software, database management software, development software tool, etc. In step 180, program 30 compares the assessed value of computer program 40 to its total cost, and notifies the user whether the value exceeds the cost or vice versa.

Program 30 can be loaded into computer 10 from a computer readable medium such as magnetic disk or tape, optical disk, DVD, network media (via TCP/IP adapter card 22), etc.

Based on the foregoing, system, method and program for assessing value of a computer program to a company have been disclosed. However, numerous modifications and substitutions can be made without deviating from the scope of the present invention. For example, instead of using the company's preferences (research, pre invest, invest, etc.), the currency of the program could be used as a way to infer industry and vendor preferences for the life of the computer programs. Therefore, the present invention has been disclosed by way of illustration and not limitation, and reference should be made to the following claims to determine the scope of the present invention.

What is claimed is:

1. A computer implemented method for assessing value of a computer program installed in a computer of a company, said method comprising three or more of the following steps:
   determining an order that the computer program is started in a startup sequence of the computer;
   determining whether the computer is used for production purposes;
   determining how frequently or at what interval said computer program or data generated by said computer program is backed up;
   determining an order or time in which said computer program is scheduled for recovery in event of disaster;
   determining a type of a library which contains said computer program;
   determining an amount of usage of said computer program by said company; and
   determining how recently the computer program or data generated by said computer program has been accessed; and
   said method further comprising the step of applying respective weighting factors to results of said three or more determining steps and combining the weight factored results to yield an assessed value of the computer program.

2. A method as set forth in claim 1 further comprising the step of determining a total number of copies of said computer program installed in computers of said company or a total number of computers of said company in which said computer program is installed.

3. A method as set forth in claim 1 further comprising the step of determining how problematic has been said computer program within the company.

4. A method as set forth in claim 1 further comprising the step of determining whether a business unit within the company is listed as the "owner" of said computer program.

5. A method as set forth in claim 1, comprising four or more of said determining steps and applying respective weighting factors to results of said four or more determining steps and combining the weight factored results.

6. A method as set forth in claim 1, comprising five or more of said determining steps and applying respective weighting factors to results of said five or more determining steps and combining the weight factored results.

7. A system for assessing value of a computer program installed in a computer of a company, said system comprising three or more of the following:
   means for determining an order that the computer program is started in a startup sequence of the computer;
   means for determining whether the computer is used for production purposes;
   means for determining how frequently or at what interval said computer program or data generated by said computer program is backed up;

means for determining an order or time in which said computer program is scheduled for recovery in event of disaster;

means for determining a type of a library which contains said computer program;

means for determining an amount of usage of said computer program by said company; and means for determining how recently the computer program or data generated by said computer program has been accessed; and said system further comprising means for applying respective weighting factors to results of said three or more determining means and combining the weight factored results to yield an assessed value of the computer program; and said system further comprising a computer on which the applying means executes.

8. A system as set forth in claim 7 further comprising means for determining a total number of copies of said computer program installed in computers of said company or a total number of computers of said company in which said computer program is installed.

9. A system as set forth in claim 7 further comprising means for determining how problematic has been said computer program within the company.

10. A system as set forth in claim 7 further comprising means for determining whether a business unit within the company is listed as the "owner" of said computer program.

11. A system as set forth in claim 7, comprising four or more of said determining means and wherein the applying means applies respective weighting factors to results of said four or more determining means and combines the weight factored results.

12. A system as set forth in claim 7, comprising five or more of said determining means and wherein the applying means applies respective weighting factors to results of said five or more determining means and combines the weight factored results.

13. A computer program product for assessing value of a computer program installed in a computer of a company, said computer program product comprising:

a computer readable storage medium; said computer program product further comprising three or more of the following:

first program instructions to determine an order that the computer program is started in a startup sequence of the computer;

second program instructions to determine whether the computer is used for production purposes;

third program instructions to determine how frequently or at what interval said computer program or data generated by said computer program is backed up;

fourth program instructions to determine an order or time in which said computer program is scheduled for recovery in event of disaster;

fifth program instructions to determine a type of a library which contains said computer program;

sixth program instructions to determine an amount of usage of said computer program by said company; and seventh program instructions to determine how recently the computer program or data generated by said computer program has been accessed; and said computer program product further comprising eighth program instructions to apply respective weighting factors to results of said three or more program instructions and combine the weight factored results to yield an assessed value of the computer program; and wherein said three or more program instructions and said eighth program instructions are stored on said storage medium.

14. A computer implemented method for assessing value of a computer program installed in a computer of a company, said method comprising:

determining an order that the computer program is started in a startup sequence of the computer;

determining whether the computer is used for production purposes;

determining how frequently or at what interval said computer program or data generated by said computer program is backed up;

determining an order or time in which said computer program is scheduled for recovery in event of disaster;

determining a type of a library which contains said computer program;

determining an amount of usage of said computer program by said company; and determining how recently the computer program or data generated by said computer program has been accessed;

determining a total number of copies of said computer program installed in computers of said company or a total number of computers of said company in which said computer program is installed;

determining how problematic has been said computer program within the company;

determining whether a business unit within the company is listed as the "owner" of said computer program; and said method further comprising the step of applying respective weighting factors to results of said determining steps and combining the weight factored results to assess the value of the computer program.

\* \* \* \* \*